(12) United States Patent
Zeng et al.

(10) Patent No.: US 9,806,658 B2
(45) Date of Patent: Oct. 31, 2017

(54) WIRELESSLY POWERED ELECTRIC MOTOR

(71) Applicant: The Boeing Company, Chicago, IL (US)

(72) Inventors: Peng Zeng, Newcastle, WA (US); Brian J. Tillotson, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 120 days.

(21) Appl. No.: 14/199,272

(22) Filed: Mar. 6, 2014

(65) Prior Publication Data

US 2015/0256115 A1    Sep. 10, 2015

(51) Int. Cl.
| | |
|---|---|
| *H02J 17/00* | (2006.01) |
| *H02P 25/16* | (2006.01) |
| *H02P 27/04* | (2016.01) |
| *H02J 5/00* | (2016.01) |
| *H04B 5/00* | (2006.01) |

(52) U.S. Cl.
CPC .............. *H02P 25/16* (2013.01); *H02J 5/005* (2013.01); *H02P 27/04* (2013.01); *H04B 5/0037* (2013.01); *H04B 5/0075* (2013.01)

(58) Field of Classification Search
CPC ...................................................... H02J 5/005
USPC ..... 318/716, 400.26, 751; 388/811; 307/104
See application file for complete search history.

(56) References Cited

U.S. PATENT DOCUMENTS

| | | | |
|---|---|---|---|
| 4,206,395 A * | 6/1980 | Okuyama et al. ............ 318/716 |
| 5,168,203 A | 12/1992 | Tepavcevic | |
| 8,884,562 B1 | 11/2014 | Cameron | |
| 2003/0038609 A1* | 2/2003 | Shien ............................ 318/751 |
| 2007/0069678 A1* | 3/2007 | Lindsey ............... H02K 11/001 318/490 |
| 2009/0066197 A1* | 3/2009 | Chen ................... F04D 25/0606 310/68 B |
| 2010/0315038 A1* | 12/2010 | Terao ...................... H01F 38/14 320/108 |
| 2011/0031915 A1* | 2/2011 | Seever ...................... H02P 6/14 318/400.26 |
| 2011/0262112 A1* | 10/2011 | Tanaka et al. ................. 388/811 |
| 2012/0133212 A1* | 5/2012 | Kamata ................... H02J 5/005 307/104 |
| 2012/0175975 A1 | 7/2012 | Bae et al. | |
| 2013/0106197 A1* | 5/2013 | Bae ...................... H04B 5/0087 307/104 |
| 2014/0306628 A1 | 10/2014 | Benson et al. | |

(Continued)

FOREIGN PATENT DOCUMENTS

| | | |
|---|---|---|
| DE | 102008037610 A1 | 7/2009 |
| EP | 0892490 A1 | 1/1999 |

(Continued)

OTHER PUBLICATIONS

Cameron, Jr., "Current Control in Brushless DC Motors," U.S. Appl. No. 13/303,673, filed Nov. 23, 2011, 43 pages.

(Continued)

*Primary Examiner* — Jorge L Carrasquillo
*Assistant Examiner* — Cortez Cook
(74) *Attorney, Agent, or Firm* — Yee & Associates, P.C.

(57) ABSTRACT

A method and apparatus for controlling an electric motor. Power is transmitted to windings of the electric motor by wireless magnetic coupling between transmission coils and the windings.

17 Claims, 4 Drawing Sheets

(56) References Cited

U.S. PATENT DOCUMENTS

2014/0333233 A1 11/2014 Zeng
2014/0354199 A1 12/2014 Zeng et al.

FOREIGN PATENT DOCUMENTS

| GB | 2498394 A | 7/2013 |
|----|-----------|--------|
| WO | WO9642132 A1 | 12/1996 |
| WO | WO2004110093 A1 | 12/2004 |

OTHER PUBLICATIONS

Benson et al., "Electric Motor Frequency Modulation System," U.S. Appl. No. 13/860,720, filed Apr. 11, 2013, 49 pages.
Zeng et al., "Active Voltage Controller for an Electric Motor," U.S. Appl. No. 13/905,392, filed May 30, 2013, 47 pages.
Zeng et al., "Remote Wireless Motor Control Law Processing System," U.S. Appl. No. 13/891,456, filed May 10, 2013, 37 pages.
Office Action, dated Jan. 26, 2017, regarding U.S. Appl. No. 14/933,333, 19 pages.
Notice of Allowance, dated Jul. 22, 2015, regarding U.S. Appl. No. 13/891,456, 10 pages.
Extended European Search Report, dated Jan. 27, 2015, regarding Application No. EP14157042.4, 7 pages.
International Search Report and Written Opinion, dated Mar. 12, 2015, regarding Application No. PCT/US2014/069154, 11 pages.
Godoy et al., "Using Serial Bluetooth Converters as a Sensor Link in Networked Control Systems," 9th IEEE International Conference on Control and Automation (ICCA), Dec. 2011, pp. 461-466.
Umirov et al., "Applicability of ZigBee for Real-Time Networked Motor Control Systems," International Conference on Control, Automation and Systems, Oct. 2008, pp. 2937-2940.
Office Action, dated Apr. 9, 2015, regarding USPTO U.S. Appl. No. 13/891,456, 16 pages.
International Preliminary Report on Patentability and Written Opinion, dated Sep. 6, 2016, regarding Application No. PCT/US2014/069154, 8 pages.
Extended European Search Report, dated Apr. 5, 2017, regarding Application No. EP16196686.6, 10 pages.

* cited by examiner

| 403 | TX A VS. OSC A FREQUENCY DIFFERENCE | TX B VS. OSC B FREQUENCY DIFFERENCE | TX C VS. OSC C FREQUENCY DIFFERENCE |
|---|---|---|---|
| 414 | LARGE | SMALL | SMALL |
| 416 | MEDIUM | MEDIUM | SMALL |
| 418 | SMALL | LARGE | SMALL |
| 420 | SMALL | MEDIUM | MEDIUM |
| 422 | SMALL | SMALL | LARGE |
| 424 | MEDIUM | SMALL | MEDIUM |

WIRELESSLY POWERED ELECTRIC MOTOR

BACKGROUND INFORMATION

1. Field

The present disclosure relates generally to electric motors and to controlling electric motors. More particularly, the present disclosure relates to controlling and providing power to an electric motor wirelessly.

2. Background

An electric motor is a device that converts electrical power into mechanical power. Electric motors may be used for various applications. For example, without limitation, electric motors may be used to drive fans, pumps, tools, disk drives, drills, and other types of devices. Electric motors may be used in various environments. For example, electric motors may be used for applications on various fixed and mobile platforms, such as aircraft and other vehicles.

Electric motors may be used on aircraft to perform various functions on the aircraft. For example, without limitation, electric motors on an aircraft may be used to move flight control surfaces, to raise and lower landing gear, and to perform other functions on the aircraft.

A conventional electric motor includes windings around a high magnetic permeability core and a rotor. An appropriately controlled electrical current in the motor windings causes the core to magnetize and the rotor to move. Mechanical power is obtained from the motor by an appropriate mechanical connection to the rotor.

In a typical electric motor, electrical power is provided on wires from an appropriate power source to the motor windings via a switching system. Switching devices in the switching system are controlled by a controller to operate the motor by controlling the current in the motor windings in an appropriate manner. For example, without limitation, the controller may be implemented using one or more microcontrollers or other appropriate devices.

The switching system, controller, and associated electronics and wiring for providing electrical power to the motor windings in a controlled manner add to the weight and volume of the motor. Furthermore, the various electronics for directing electrical power to the motor windings consume power and produce heat. The effects of these electronic components on the weight, volume, power consumption, and temperature of a motor may limit the applications in which an electric motor may be used.

Therefore, it would be desirable to have a method and apparatus that take into account at least some of the issues discussed above, as well as other possible issues.

SUMMARY

Embodiments of the present disclosure provide a method of controlling an electric motor. Power is transmitted to windings of the electric motor by wireless magnetic coupling between transmission coils and the windings.

Embodiments of the present disclosure also provide an electric motor comprising a rotor and a plurality of windings. Each of the plurality of windings has a different resonant frequency.

Embodiments of the present disclosure also provide an apparatus comprising a power transmitter and a controller. The power transmitter is configured to transmit power to windings of an electric motor by wireless magnetic coupling to the windings. The controller is configured to control the power transmitter to control timing of transmitting the power to the windings.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

Figure 1:
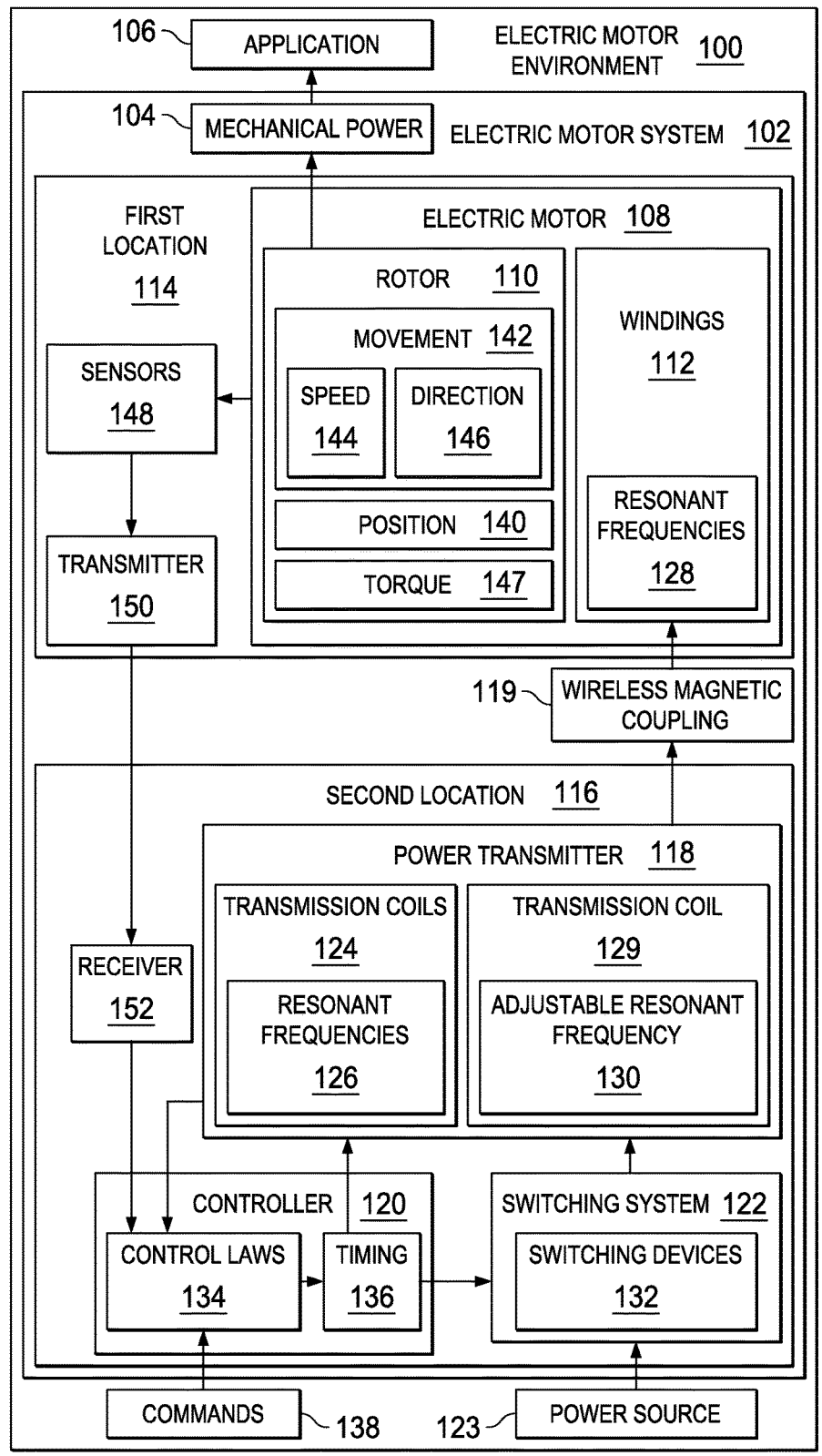
FIG. 1 is an illustration of a block diagram of an electric motor environment in accordance with an illustrative embodiment.

The different illustrative embodiments recognize and take into account a number of different considerations. "A number," as used herein with reference to items, means one or more items. For example, "a number of different considerations" means one or more different considerations.

The different illustrative embodiments recognize and take into account that electronic components for providing power to the windings of a motor, such as a motor controller and switching system, add weight, size, energy consumption, and heat to the overall motor system. A cooling system may be used to cool the electronic components of a motor. In this case, the cooling system further increases the weight, size, and energy consumption of the motor system. The power source for an electric motor may be the physically largest part of the motor system. In some cases, the size of the power source may be greater than the size of the motor itself.

The different illustrative embodiments also recognize and take into account that using a single controller to control the providing of power to an electric motor may not be sufficient in many applications where the improper operation of the motor could result in a catastrophic system failure. For example, incorrect operation of an electric motor by a controller may damage the motor beyond repair. Therefore, for some applications, a more redundant system of motor control may be desirable. For example, without limitation, several controllers may be used to simultaneously process control laws for controlling the operation of a motor. If one of the controllers processes the control law incorrectly, correct operation of the motor is maintained by the other controllers. While such a redundant system may be robust, the use of multiple controllers increases the size, weight, energy consumption, and heat of the motor system. Therefore, controller redundancy may not be feasible for some applications where one or more of small size, low weight, low energy consumption, and low heat are desired or required.

The different illustrative embodiments recognize and take into account that the effects of the electronic components of a motor on the size, weight, energy consumption, and heat of an electric motor system may limit the flexibility of using electric motors in various applications. For example, without limitation, the size and heat of a motor system may prevent the use of an electric motor in certain flight control applications, medical implant applications, or other applications that otherwise may benefit from the use of an electric motor.

The different illustrative embodiments recognize and take into account that the bulk and weight of the electronic components of an electric motor may be reduced by using more complex circuitry and costly components. However, using such complex circuitry and costly components raises the cost of an electric motor system.

The different illustrative embodiments also recognize and take into account that electric motors generate electromagnetic interference. For example, electromagnetic interference may be produced by the windings and the permanent magnets in an electric motor. This electromagnetic interference may cause errors in the electronics for controlling the operation of a motor if the electronics are located in close proximity to the electromagnetic interference generating components of the motor. Shielding, damping circuits, or both may be used to reduce the effects of electromagnetic interference on the electronic components of a motor. However, the addition of such shielding or damping circuits further increases the size and weight of the motor system.

The different illustrative embodiments also recognize and take into account that the relatively expensive electronic components of a motor may be vulnerable in harsh environments such as radiation, chemical, and biologically active environments. Therefore, electric motors that must endure such harsh environments may require expensive protective measures such as shielding, hermetic seals, and insulating material. However, the use of such protective measures further increases the size and weight of an electric motor system.

Alternatively, electronic components of a motor may be located on the opposite side of a barrier from a harsh environment in which other components of the motor may be placed. The barrier may be configured to contain the harsh environment or otherwise separate the harsh environment from the electronic components of the motor. In this case, holes may be drilled or otherwise formed in the barrier so that wires can be run from the electronic components of the motor to the other components of the motor in the harsh environment. However, the addition of such a barrier increases the size and weight of the system, and the presence of holes in the barrier increases the risk of leakage from the harsh environment.

Therefore, illustrative embodiments provide a method and apparatus for controlling an electric motor by transmitting power to the windings of the motor by wireless magnetic coupling between transmission coils and the windings of the motor. For example, power may be transmitted to the windings of an electronic motor by resonant inductive coupling between the windings of the motor and transmission coils having the same resonant frequencies as the windings. Illustrative embodiments allow the electronic components of a motor, such as the controller and switching system, to be located at a different location from the windings and rotor of the motor.

Illustrative embodiments allow for the size, weight, energy consumption, and heat of an electric motor system to be reduced at the location where the motor produces mechanical power. Therefore, illustrative embodiments allow for increased flexibility in the applications in which an electric motor may be used.

Illustrative embodiments also solve the problem of protecting the electronic components of a motor from the effects of electromagnetic interference produced by the motor. In accordance with an illustrative embodiment, the electronic components of a motor may be located at a sufficient distance from the electromagnetic interference producing components of the motor such that the undesired effects of electromagnetic interference on the electronic components are reduced or eliminated.

Illustrative embodiments also solve the problem of having to protect or discard the relatively expensive and vulnerable electronic components of a motor operating in a harsh environment. In accordance with an illustrative embodiment, an electric motor may be positioned for use in such a harsh operating environment. However, the more vulnerable controller, switching system, and power supply for the motor may be positioned at another location outside of the harsh environment. Furthermore, since power and control may be provided to a motor wirelessly, in accordance with an illustrative embodiment, the need to provide holes to run wires through a barrier containing a harsh environment in which the motor may be located is eliminated. Therefore, the risk of leaks from the contained environment is reduced. For example, without limitation, illustrative embodiments may be used to provide electric motor power in a more ruggedized and stable quarantine chamber or other contained environment.

Turning to FIG. 1, an illustration of a block diagram of an electric motor environment is depicted in accordance with an illustrative embodiment. Electric motor environment 100 is an example of an environment in which an illustrative embodiment may be implemented.

Electric motor environment 100 may include any environment in which electric motor system 102 may be used to provide mechanical power 104 for application 106. For example, without limitation, electric motor environment 100 may include a manufacturing environment, a research environment, a medical environment, a military environment, a transportation environment, or any other appropriate environment in which mechanical power 104 is required or desired for application 106. For example, without limitation, electric motor environment 100 may include a mobile platform such as an aircraft or other appropriate vehicle. Electric motor environment 100 may include a human body.

Electric motor system 102 may be configured to provide mechanical power 104 for any appropriate application 106 in electric motor environment 100. For example, without limitation, application 106 may include driving a fan, a pump, a tool, a disk drive, a drill, any other appropriate type of device, or various combinations of devices. For example, without limitation, application 106 for electric motor system 102 on an aircraft may include moving flight control surfaces, raising and lowering landing gear, and performing other functions or various combinations of functions on an aircraft.

Electric motor system 102 includes electric motor 108. Electric motor 108 comprises rotor 110 and windings 112. Rotor 110 is configured to move in response to magnetic fields generated by appropriately controlled electrical currents in windings 112. Mechanical power 104 for application 106 may be obtained by any appropriate mechanical connection to rotor 110. Windings 112 comprise wires that are laid in coils. The wires comprising windings 112 may be wrapped around a magnetic core. Alternatively, the wires comprising windings 112 may not be wrapped around a core material or windings 112 may have an air core.

In accordance with an illustrative embodiment, electronics for controlling and providing power to electric motor 108 may be physically separated from electric motor 108. For example, electric motor 108 may be located at first location 114 and the electronics for controlling and providing power to electric motor 108 may be located at second location 116. First location 114 may be any appropriate distance from second location 116. For example, first location 114 may be separated from second location 116 by a sufficient distance such that electromagnetic interference produced by electric motor 108 at first location 114 does not affect the electronics at second location 116 in an undesired manner.

First location 114 and second location 116 may be separated by an appropriate physical barrier. For example, electric motor 108 may be located in a relatively harsh environment at first location 114 on one side of the barrier. The more vulnerable electronic components for operating electric motor 108 may be located at second location 116 on the other side of the barrier, outside of the harsh environment. In this case, special protective measures to protect the electronic components from the harsh environment may not be needed. In accordance with an illustrative embodiment, all communication between electric motor 108 at first location 114 and the electronics at second location 116 may be wireless. Therefore, no holes for running wires from the power and control electronics to electric motor 108 need to be formed in any barrier separating first location 114 from second location 116.

Electronics for controlling and providing power to electric motor 108 include power transmitter 118, controller 120, switching system 122, and power source 123. In accordance with an illustrative embodiment, power transmitter 118, controller 120, switching system 122, and power source 123 may be physically separated from rotor 110 and windings 112 of electric motor 108. For example, without limitation, power transmitter 118, controller 120, switching system 122, and power source 123 may be located at second location 116 when rotor 110 and windings 112 of electric motor 108 are located at first location 114.

Power transmitter 118 is configured to provide appropriately controlled power to electric motor 108. In accordance with an illustrative embodiment, power transmitter 118 is configured to transmit power to windings 112 of electric motor 108 via wireless magnetic coupling 119. Wireless magnetic coupling 119 may include any appropriate method in which power transmitter 118 generates magnetic fields that are wirelessly coupled to windings 112 of electric motor 108 to produce appropriate currents in windings 112 to operate electric motor 108.

In accordance with an illustrative embodiment, wireless magnetic coupling 119 between power transmitter 118 and windings 112 of electric motor 108 may include resonant inductive coupling. Resonant inductive coupling also may be known as electrodynamic induction. Resonant inductive coupling is the near field wireless transmission of electrical energy between two coils that are tuned to resonate at the same frequency. Resonant inductive coupling may be used to transmit power wirelessly from power transmitter 118 to windings 112 of electric motor 108 at a range of up to several meters, depending on the resonant frequencies employed.

Power transmitter 118 may include transmission coils 124 having resonant frequencies 126. For example, transmission coils 124 may include coils of wires connected to capacitors to provide the appropriate resonant frequencies 126 for transmission coils 124. Resonant frequencies 126 of transmission coils 124 may match resonant frequencies 128 of windings 112 in electric motor 108. For example, capacitors may be connected to the coils forming windings 112 to provide the appropriate resonant frequencies 128 for windings 112. Transmission coils 124 having resonant frequencies 126 and windings 112 having resonant frequencies 128 that match resonant frequencies 126 of transmission coils 124 may form resonance transformers to provide for the wireless transmission of power from power transmitter 118 to electric motor 108 by resonant inductive coupling. The resonance transformers formed by transmission coils 124 and windings 112 also may be known as a resonant.

Various different windings 112 of electric motor 108 may have different resonant frequencies 128. Transmission coils 124 in power transmitter 118 may have different resonant frequencies 126 that correspond to the different resonant frequencies 128 of windings 112. The transmission of power by power transmitter 118 at different resonant frequencies 126 corresponding to the different resonant frequencies 128 of windings 112 allows power transmitted from power transmitter 118 to be controlled to induce currents in individual ones of windings 112 in an appropriate sequence to cause rotor 110 to turn. Preferably, a current is induced only in designated ones of windings 112 having a resonant frequency that corresponds to the resonant frequency at which power is being transmitted by power transmitter 118.

To prevent currents from being generated in windings 112 that have different resonant frequencies from the resonant frequency at which power is transmitted from power transmitter 118, resonant frequencies 128 of windings 112, and thus also corresponding resonant frequencies 126 of transmission coils 124, may be selected so that resonant frequencies 128 are not harmonics of each other. Resonant frequencies 128 of windings 112, and thus resonant frequencies 126 of transmission coils 124 as well, also or alternatively may be separated from each other by more than the bandwidth of the resonant peak for each of windings 112 or transmission coils 124. The bandwidth of a resonant peak is the width of a plot of power versus frequency measured between the points on each side of the peak power frequency at which the power is one-half of the peak power.

Mutual inductance between rotor 110 and windings 112 may cause the total inductance of windings 112 to change as rotor 110 moves. As a result, resonant frequencies 128 of windings 112 may change as rotor 110 moves. It may be desirable to adjust the frequencies of power transmissions from power transmitter 118 to windings 112 continuously to match the changing resonant frequencies 128 of windings 112. For example, without limitation, the frequencies of power transmissions by power transmitter 118 may be adjusted using an appropriate computational model, appropriate feedback information, or both. Alternatively, or in addition, variable capacitors connected electrically to windings 112 and mechanically to rotor 110 may be configured to change capacitance as the inductance of windings 112 changes so that resonant frequencies 128 of windings 112 remain constant as rotor 110 moves. Another solution is to transfer a large amount of energy to windings 112 when resonant frequencies 128 of windings 112 match resonant frequencies 126 of power transmitter 118. The energy may be stored in windings 112 and consumed over the interval until resonant frequencies 128 of windings 112 match resonant frequencies 126 of power transmitter 118 again.

Another solution to the problem of the effect of the movement of rotor 110 on resonant frequencies 128 of windings 112 is to transmit power from power transmitter 118 substantially continuously at all resonant frequencies 126 simultaneously. Capacitors for windings 112 may be selected such that resonant frequencies 128 of windings 112 are mismatched from resonant frequencies 126 of power transmitter 118 by a selected offset. The offset is selected such that when rotor 110 is in a position where commutation needs to occur, the effect of the rotor position on the inductance of windings 112 causes resonant frequencies 128 for windings 112 to match resonant frequencies 126 for power transmitter 118 and power is transferred. In this case, electric motor 108 is mechanically configured to draw power from power transmitter 118 at the appropriate time when rotor 110 is in the appropriate position with respect to windings 112.

Power transmitter 118 may include a number of transmission coils 124 with fixed resonant frequencies 126 corresponding to resonant frequencies 128 of windings 112 in electric motor 108. Alternatively, power transmitter 118 may include transmission coil 129 having adjustable resonant frequency 130. For example, without limitation, adjustable resonant frequency 130 of transmission coil 129 may be adjusted electronically by controller 120 to match resonant frequencies 128 of windings 112. As another example, transmission coil 129 may be configured to operate at a single resonant frequency but output multiple different frequencies via proper phase relationships or harmonic-producing electronics.

Use of transmission coil 129 with adjustable resonant frequency 130 allows power transmitter 118 to be tuned to resonant frequencies 128 of a given electric motor 108. This tuning ability may allow for larger manufacturing errors during motor manufacturing. Therefore, for example, power transmitter 118 with such resonant frequency tuning capability may be used to power relatively cheap and disposable electric motors. Power transmitter 118 with such tuning capability also may be used to provide power for a variety of different motor types. However, power transmitter 118 using transmission coils 124 with fixed resonant frequencies 126 may make programming of controller 120 simpler and may enable higher commutation speeds, and thus higher rotation speeds, for electric motor 108.

The electrical power that is transmitted by power transmitter 118 to electric motor 108 may be provided to power transmitter 118 from power source 123. Power source 123 may include any appropriate source of direct current or alternating current electrical power. For example, without limitation, power source 123 may include a battery, a generator, an alternating current power outlet, an alternating current power bus, a direct current power bus, any other appropriate source of electrical power, or any appropriate combination of sources of electrical power.

Electrical power may be provided from power source 123 to power transmitter 118 via switching system 122. Switching system 122 may include any number of appropriate switching devices 132 for connecting power source 123 to power transmitter 118. For example, without limitation, switching devices 132 may be implemented using any appropriate solid state switching devices, such as appropriate transistors. Switching devices 132 may be arranged in an appropriate configuration in switching system 122 to allow controller 120 to direct power from power source 123 to transmission coils 124 in power transmitter 118 in an appropriate manner to operate electric motor 108 by controlling switching devices 132. For example, without limitation, switching devices 132 may be arranged in an appropriate bridge configuration in switching system 122.

Controller 120 may be configured to control the operation of electric motor 108 by controlling the transmitting of power to windings 112 of electric motor 108 by power transmitter 118. For example, without limitation, controller 120 may be configured to control the transmitting of power to windings 112 in electric motor 108 by controlling switching devices 132 in switching system 122 to control the providing of electrical power from power source 123 to transmission coils 124. Alternatively, controller 120 may be configured to control the transmitting of power to windings 112 in electric motor 108 by controlling the operation of oscillators in power transmitter 118 that are used to drive current in transmission coils 124 at resonant frequencies 126. Switching system 122 may be simplified, or even possibly eliminated, if the transmission of power by power transmitter 118 is controlled by controlling the operation of oscillators in power transmitter 118 in this manner.

Controller 120 may be implemented in hardware or in hardware in combination with software. For example, without limitation, controller 120 may include hardware comprising circuits that operate to perform one or more of the functions performed by controller 120 as described herein. In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Controller 120 may use a number of control laws 134 to control the operation of electric motor 108. Control laws 134 may include one or more processes, functions, or other mechanisms configured to control the operation of electric motor 108. For example, without limitation, control laws 134 may define timing 136 of providing power to windings 112 of electric motor 108 to operate electric motor 108 in a desired manner. Timing 136 may indicate when power is to be provided to individual ones of windings 112 to achieve desired operation of electric motor 108. Timing 136 may include a sequence or order in which power is to be provided to individual ones of windings 112 to achieve desired operation of electric motor 108. Controller 120 may use control laws 134 to determine timing 136 of the switching of switching devices 132 in switching system 122 to provide power from power source 123 to transmission coils 124 such that power is provided to windings 112 of electric motor 108 in the desired sequence.

It may take some time for power transmitted from power transmitter 118 to build up and induce the desired current in windings 112 of electric motor 108. This delay in inducing current in windings 112 may be taken into account in control laws 134 or otherwise used to adjust timing 136 by controller 120 so that power transmitter 118 begins to transmit power to selected windings 112 at the appropriate time.

Control laws 134 may define timing 136 for controlling electric motor 108 in response to commands 138. For example, without limitation, commands 138 may identify a desired speed and direction of rotation of rotor 110, a desired amount of torque to be provided by rotor 110, or both. Commands 138 may be provided to controller 120 in any appropriate manner. For example, commands 138 may be provided to controller 120 by a human operator via an appropriate wired or wireless operator interface. Alternatively, or in addition, commands 138 for the operation of electric motor 108 may be provided to controller 120 by an automated system.

Control laws 134 may define timing 136 for controlling electric motor 108 using feedback from electric motor 108. For example, without limitation, feedback identifying position 140 of rotor 110, movement 142 of rotor 110, torque 147 provided by rotor 110, or any combination thereof, may be used by control laws 134 for controlling electric motor 108. Position 140 of rotor 110 refers to the rotational position of rotor 110 in electric motor 108. Movement 142 of rotor 110 may include speed 144 and direction 146 of rotation of rotor 110. Torque 147 refers to the angular force provided by rotor 110.

Sensors 148 may be used to provide the desired feedback from electric motor 108 for use by controller 120. Sensors 148 may be configured to identify position 140 of rotor 110, movement 142 of rotor 110, torque 147 provided by rotor 110, or any combination thereof. Alternatively, sensors 148 may be configured to provide information from which position 140 of rotor 110, movement 142 of rotor 110, torque 147 provided by rotor 110, or any combination thereof, may be determined by controller 120. For example, without limitation, sensors 148 may include Hall effect devices. A plurality of Hall effect devices may be used to identify position 140 of rotor 110 in a known manner. Alternatively, or in addition, sensors 148 may include appropriate sensors for identifying currents in windings 112, any other appropriate sensors, or various combinations of appropriate sensors.

Sensors 148 may be connected or attached to electric motor 108 in any appropriate manner to obtain the desired feedback information for use by controller 120. Information from sensors 148 connected to electric motor 108 at first location 114 may be transmitted to controller 120 at second location 116 using transmitter 150. The information transmitted from first location 114 by transmitter 150 may be received by controller 120 at second location 116 using receiver 152. For example, without limitation, any appropriate transmitter 150 and receiver 152 may be used to establish a wireless communications link, a wired communications link, an optical communications link or any other appropriate communications link between sensors 148 at first location 114 and controller 120 at second location 116.

Power may be provided for the operation of sensors 148 and transmitter 150 at first location 114 in any appropriate manner. For example, without limitation, power for sensors 148 and transmitter 150 may be provided from windings 112 of electric motor 108. In this case, extra power may be provided to windings 112 from power transmitter 118 for the operation of sensors 148 and transmitter 150 in addition to moving rotor 110.

Feedback identifying position 140 of rotor 110, movement 142 of rotor 110, torque 147 provided by rotor 110, or any combination thereof, for use by controller 120 may be obtained without the use of sensors 148 connected to electric motor 108. In this case, sensors 148 and transmitter 150 associated with electric motor 108 at first location 114 and receiver 152 associated with controller 120 at second location 116 may not be needed. For example, without limitation, electric motor 108 may be modeled in controller 120 so that controller 120 is able to calculate position 140 of rotor 110 at any given time. Alternatively, or in addition, position 140 of rotor 110, movement 142 of rotor 110, torque 147 provided by rotor 110, or any combination thereof, may be identified from the effect of position 140 and movement 142 of rotor 110 on power transmitter 118.

For example, position 140 of rotor 110 may affect the inductance of transmission coils 124 in power transmitter 118. Controller 120 may be configured to identify this effect of position 140 of rotor 110 on the inductance of transmission coils 124 to identify position 140 of rotor 110. The identified position 140 of rotor 110 then may be used by controller 120 to identify appropriate timing 136 for providing power to windings 112 of electric motor 108 via power transmitter 118.

Movement 142 of rotor 110 also may affect the power drawn by transmission coils 124 for transmission to windings 112 of electric motor 108. Controller 120 may be configured to identify this effect of movement 142 of rotor 110 on the power drawn by transmission coils 124 to identify movement 142 of rotor 110, torque 147 provided by rotor 110, or both. The identified movement 142 of rotor 110, torque 147 provided by rotor 110, or both, then may be used by controller 120 to identify appropriate timing 136 for providing power to windings 112 of electric motor 108 via power transmitter 118.

The illustration of FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, illustrative embodiments may be used to provide power wirelessly to various different types of electric motors. Since resonant inductive coupling creates alternating current, it may be used to provide power wirelessly to an alternating current motor. As the alternating current oscillates between positive and negative polarities at the resonant frequency, the poles of the motor windings toggle as well. An alternating current motor may be configured such that the resonant frequency matches with the frequency at which the current in the motor windings needs to switch directions to rotate a permanent magnet rotor. Such a configuration would eliminate the need for a commutator or slip ring in the motor. An alternating current motor that is controlled and powered wirelessly in accordance with an illustrative embodiment may be particularly useful in applications where a motor having relatively very small size, weight, and power is desired, as a relatively inexpensive disposable motor, or in other appropriate applications.

Illustrative embodiments may be used to provide power wirelessly for an alternating current motor with an iron rotor that is not a permanent magnet. In this case, the field strength, not the field direction, created by the current in the motor windings attracts the iron rotor. Such a motor is capable of more precise and irregular commutation control than the lower cost alternating current motor described in the immediately previous paragraph. Such a motor may be particularly useful in applications for moving mechanical joints, such as robotic arms and hands, or in other appropriate applications.

Another motor configuration in which illustrative embodiments may be employed may include a set of stator coils in the center with spinning permanent magnets outside acting as the rotor. This type of motor may have relatively higher torque but slower rotation speed than the other types of motors described above. It takes longer for this type of motor to rotate one full cycle due to the increase in the circumference of the rotor motion.

A plurality of power transmitters may be arranged in an appropriate manner to provide power wirelessly to a plurality of electric motors in accordance with an illustrative embodiment. For example, without limitation, a plurality of electric motors may be used in the joints of a robot, a bionic limb, an artificial organ, a mechanical creature, or another appropriate application. In this case, a plurality of power transmitters may be arranged in a command center configuration or other appropriate configuration such that the plurality of electric motors receives wireless power and control from an array of power transmitters in accordance with an illustrative embodiment.

A plurality of controllers may be used to control the providing of power wirelessly to an electric motor in accordance with an illustrative embodiment. For example, without limitation, a plurality of controllers may be configured to determine simultaneously the next best step for the control of an electric motor. A power transmitter in accordance with an illustrative embodiment may be used to transmit power wirelessly to the electric motor in accordance with the result that is reached by most of the plurality of controllers. Use of multiple controllers in this manner may provide for more robust motor operation. Because the controllers are physically separate from the electric motor itself, the number of controllers for controlling the motor may be increased without impacting the size and weight of the motor.

Figure 2:
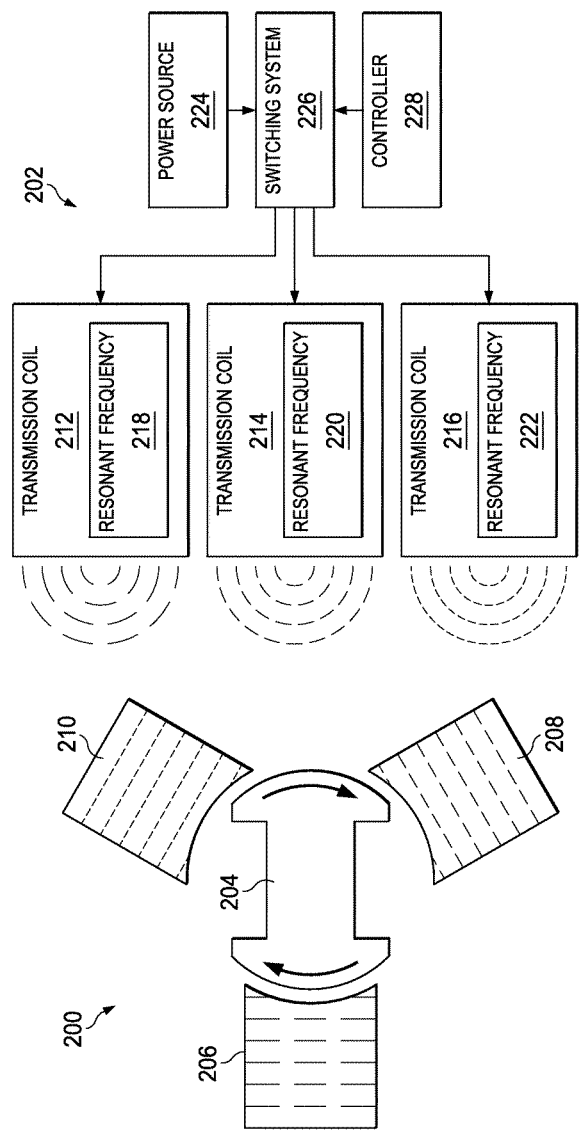
FIG. 2 is an illustration of controlling and providing power to an electric motor wirelessly in accordance with an illustrative embodiment.

Turning to FIG. 2, an illustration of controlling and providing power to an electric motor wirelessly is depicted in accordance with an illustrative embodiment. In this example, electric motor 200 is an example of one implementation of electric motor 108 in FIG. 1. Power is provided to electric motor 200 wirelessly by power transmitter 202. Power transmitter 202 is an example of one implementation of power transmitter 118 in FIG. 1. In this example, electric motor 200 is an example of a three-phase motor. Illustrative embodiments may be used to provide power wirelessly to electric motors having any other number of phases.

Electric motor 200 comprises rotor 204 and windings 206, 208, and 210. Windings 206 may be referred to as first windings. Windings 208 may be referred to as second windings. Windings 210 may be referred to as third windings. Windings 206, 208, and 210 are configured to have different resonant frequencies. For example, windings 206 may be configured to have a first resonant frequency. Windings 208 may be configured to have a second resonant frequency. Windings 210 may be configured to have a third resonant frequency.

Power transmitter 202 comprises transmission coil 212, transmission coil 214, and transmission coil 216. Transmission coil 212 may be referred to as first transmission coil. Transmission coil 214 may be referred to as second transmission coil. Transmission coil 216 may be referred to as third transmission coil.

Transmission coils 212, 214, and 216 are configured to have different resonant frequencies corresponding to the resonant frequencies of windings 206, 208, and 210. For example, transmission coil 212 may have resonant frequency 218 corresponding to the first resonant frequency of windings 206. Transmission coil 214 may have resonant frequency 220 corresponding to the second resonant frequency of windings 208. Transmission coil 216 may have resonant frequency 222 corresponding to the third resonant frequency of windings 210.

Electrical power may be provided to transmission coils 212, 214, and 216 from power source 224 via switching system 226. To operate electric motor 200, current is sent through each of windings 206, 208, and 210 in an appropriate sequence to make rotor 204 turn. Controller 228 is configured to determine which one of windings 206, 208, and 210 should be provided with power at any point in the sequence. Controller 228 may operate switching devices in switching system 226 to provide power from power source 224 to each one of transmission coils 212, 214, and 216 in the appropriate sequence. In turn, each one of transmission coils 212, 214, and 216 induces a change in magnetic flux at corresponding resonant frequency 218, 220, or 222. These changes in magnetic flux at resonant frequencies 218, 220, and 222 in the appropriate sequence induce the desired currents in windings 206, 208, and 210 in the appropriate sequence to turn rotor 204. Because windings 206, 208, and 210 have different resonant frequencies, the transmission of power from power transmitter 202 at one of resonant frequencies 218, 220, or 222 will only induce current in the one of windings 206, 208, or 210 having the corresponding resonant frequency. This allows power to be provided to each of windings 206, 208, and 210 individually in the appropriate sequence.

Figures 3, 4:
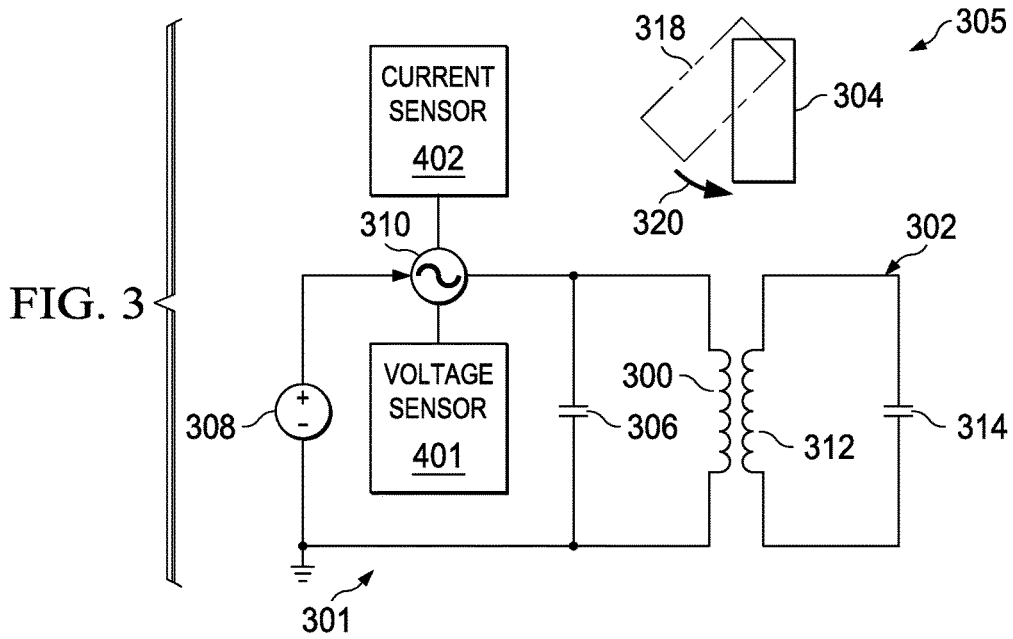
FIG. 3 is an illustration of a schematic circuit diagram of a transmission coil and windings for an electric motor in accordance with an illustrative embodiment.
FIG. 4 is an illustration of a table for identifying the position of a rotor for an electric motor in accordance with an illustrative embodiment.

Turning to FIG. 3, an illustration of a schematic circuit diagram of a transmission coil and windings for an electric motor is depicted in accordance with an illustrative embodiment. Transmission coil 300 is an example of one implementation of one of transmission coils 124 in power transmitter 118 in FIG. 1. Transmission coil 300 may comprise a part of power transmitter 301. Windings 302 is an example of one implementation of windings 112 for one phase of electric motor 108 in FIG. 1. Windings 302 and rotor 304 comprise parts of electric motor 305.

Transmission coil 300 may comprise a coil of wire. Capacitor 306 is connected across transmission coil 300 to establish a desired resonant frequency for transmission coil 300 in accordance with the following formula:

$$f = \frac{1}{2\pi\sqrt{LC}}$$

Where f is the resonant frequency of transmission coil 300, L is the inductance of transmission coil 300, and C is the capacitance of capacitor 306. Capacitor 306 may be implemented using one or more capacitors.

Power may be provided to transmission coil 300 from power source 308 via oscillator 310. Oscillator 310 may be implemented as an analog or other appropriate device that is configured to drive current at the nominal resonant frequency of transmission coil 300 to induce a change in magnetic flux. Oscillator 310 may be controlled in an appropriate manner such that the change in magnetic flux at the resonant frequency is produced by transmission coil 300 at the appropriate time for inducing a current in windings 302.

Windings 302 comprise coil 312. For example, without limitation, coil 312 may comprise wires wrapped around a magnetic core. Alternatively, the wires comprising coil 312 may not be wrapped around a core material or coil 312 may have an air core. Capacitor 314 is connected to windings 302 to establish a desired resonant frequency for windings 302 in accordance with the formula presented above, where, in this case, f is the resonant frequency of windings 302, L is the inductance of coil 312, and C is the capacitance of capacitor 314. Capacitor 314 may be implemented using one or more capacitors.

Transmission coil 300 and capacitor 306 in power transmitter 301 and coil 312 and capacitor 314 in windings 302 may be selected such that the resonant frequency of transmission coil 300 matches the resonant frequency of windings 302. In this case, the magnetic flux induced in transmission coil 300 by oscillator 310 may be coupled to windings 302 by resonant inductive coupling. The magnetic flux coupled to windings 302 induces a current in windings 302 that causes rotor 304 to move. Oscillator 310 may be controlled in an appropriate manner such that the magnetic flux is generated in transmission coil 300 to induce the current in windings 302 at the appropriate time to move rotor 304.

The total inductance of windings 302 may change as the position of rotor 304 with respect to windings 302 changes. Mutual inductance between windings 302 and transmission coil 300 may cause a corresponding change in the inductance of transmission coil 300 as rotor 304 moves. For example, the total inductance of transmission coil 300 may change as rotor 304 moves from position 318 in the direction of arrow 320. The position of rotor 304, the movement of rotor 304, or both may be identified by this effect of the movement of rotor 304 on power transmitter 301.

Turning to FIG. 4, an illustration of a table for identifying the position of a rotor for an electric motor is depicted in accordance with an illustrative embodiment. The method described with reference to table 400 comprises a static measurement of rotor position based on the effect of rotor position on the inductance of transmission coils in a power transmitter in accordance with an illustrative embodiment. This method of identifying the position of a rotor may be useful, for example, without limitation, for motor start-up, to identify which motor windings need to be powered up first to start rotation of the rotor. This method of identifying the position of a rotor also may be useful for other appropriate purposes for controlling the operation of an electric motor. The method described with reference to table 400 may be implemented, for example, in controller 120 to identify position 140 of rotor 110 in electric motor 108 from the effect of position 140 of rotor 110 on transmission coils 124 in power transmitter 118 in FIG. 1.

The inductance of particular windings in an electric motor may increase as the rotor in the electric motor gets closer to the particular windings. By mutual inductance, the inductance of the transmission coil for providing power wirelessly to the windings in accordance with an illustrative embodiment increases as well. As the inductance of the transmission coil increases, the resonant frequency of the transmission coil decreases. This change in resonant frequency may be identified and used to identify the rotor position relative to the motor windings corresponding to the transmission coil. The same process may be used to identify the position of the rotor relative to the other windings of the motor. Thus, the position of the rotor relative to all of the motor windings may be identified from the changes in resonant frequencies in the corresponding transmission coils for providing power wirelessly to the windings.

With reference once again to FIG. 3, a change in the resonant frequency of transmission coil 300 may be identified by comparing the frequency of oscillator 310 and the resonant frequency of the parallel circuit comprising transmission coil 300 and capacitor 306. The frequency of oscillator 310 may be fixed at the nominal resonant frequency of transmission coil 300 and capacitor 306. However, the actual resonant frequency of the parallel circuit comprising transmission coil 300 and capacitor 306 changes as the inductance of transmission coil 300 changes due to the changing position of rotor 304. Therefore, the change in the resonant frequency of transmission coil 300 due to the changing position of rotor 304 may be identified by comparing the frequency of oscillator 310 to the actual resonant frequency of transmission coil 300.

For example, without limitation, the difference between the frequency of oscillator 310 and the actual resonant frequency of transmission coil 300 may be identified using the AC voltage from oscillator 310 and the AC current from oscillator 310. The AC voltage from oscillator 310 may be identified using voltage sensor 401. The AC current from oscillator 310 may be identified using current sensor 402. Any appropriate voltage sensor 401 and current sensor 402 may be used to identify the AC voltage and AC current, respectively, from oscillator 310. By measuring the phase shift between the AC voltage from oscillator 310 and the AC current from oscillator 310, measuring the amplitudes of the AC voltage from oscillator 310 and the AC current from oscillator 310, and computing the ratio thereof, the impedance of the parallel circuit comprising transmission coil 300 and capacitor 306 at the frequency of oscillator 310 may be identified in a known manner. This impedance may be used to determine the difference between the actual resonant frequency of transmission coil 300 and the frequency of oscillator 310 driving transmission coil 300 at the nominal resonance frequency of transmission coil 300. The relative differences between these frequencies at the transmission coils corresponding to various motor windings may be used to identify the position of the rotor with respect to the windings.

Returning to FIG. 4, table 400 shows an example of how the relative differences between the transmission coil and oscillator frequencies at the transmission coils corresponding to the windings in a three-phase motor may be used to identify the position of a rotor with respect to the motor windings. Illustrative embodiments may identify the position of the rotor in an electric motor having any other number of phases using a similar method. In this example, the position of a rotor in electric motor 403 comprising windings A 404, windings B 406, and windings C 408 is identified. Transmission coil TX A is used to provide power wirelessly to windings A 404 at a resonant frequency corresponding to the resonant frequency of windings A 404. Oscillator OSC A is configured to drive transmission coil TX A at the nominal resonant frequency of transmission coil TX A. Transmission coil TX B is used to provide power wirelessly to windings B 406 at a resonant frequency corresponding to the resonant frequency of windings B 406. Oscillator OSC B is configured to drive transmission coil TX B at the nominal resonant frequency of transmission coil TX B. Transmission coil TX C is used to provide power wirelessly to windings C 408 at a resonant frequency corresponding to the resonant frequency of windings C 408. Oscillator OSC C is configured to drive transmission coil TX C at the nominal resonant frequency of transmission coil TX C. In table 400, a large frequency difference is a difference in frequency that is greater than a medium frequency difference. A medium frequency difference is a difference in frequency that is greater than a small frequency difference.

When the rotor is in position 414, the rotor is at the position in its rotation that is closest to windings A 404 and relatively far from windings B 406 and windings C 408. In this case, position 414 of the rotor has the largest effect on the inductance of windings A 404 and corresponding transmission coil TX A and a smaller effect on the inductance of windings B 406, corresponding transmission coil TX B, windings C 408, and corresponding transmission coil TX C. This effect of position 414 of the rotor may be identified by a relatively large difference between the frequency of transmission coil TX A and the frequency of oscillator OSC A driving transmission coil TX A, a relatively small difference between the frequency of transmission coil TX B and the frequency of oscillator OSC B driving transmission coil TX B, and a relatively small difference between the frequency of transmission coil TX C and the frequency of oscillator OSC C driving transmission coil TX C.

When the rotor is in position 416, the rotor is at the position in its rotation that is between windings A 404 and windings B 406 and relatively far from windings C 408. In this case, position 416 of the rotor has a relatively larger effect on the inductance of windings A 404, corresponding transmission coil TX A, windings B 406, and corresponding transmission coil TX B and a relatively smaller effect on the inductance of windings C 408, and corresponding transmission coil TX C. This effect of position 416 of the rotor may be identified by a relatively medium difference between the frequency of transmission coil TX A and the frequency of oscillator OSC A driving transmission coil TX A, a relatively medium difference between the frequency of transmission coil TX B and the frequency of oscillator OSC B driving transmission coil TX B, and a relatively small difference between the frequency of transmission coil TX C and the frequency of oscillator OSC C driving transmission coil TX C.

When the rotor is in position 418, the rotor is at the position in its rotation that is closest to windings B 406 and relatively far from windings A 404 and windings C 408. In this case, position 418 of the rotor has the largest effect on the inductance of windings B 406 and corresponding transmission coil TX B and a smaller effect on the inductance of windings A 404, corresponding transmission coil TX A, windings C 408, and corresponding transmission coil TX C. This effect of position 418 of the rotor may be identified by a relatively small difference between the frequency of transmission coil TX A and the frequency of oscillator OSC A driving transmission coil TX A, a relatively large difference between the frequency of transmission coil TX B and the frequency of oscillator OSC B driving transmission coil TX B, and a relatively small difference between the frequency of transmission coil TX C and the frequency of oscillator OSC C driving transmission coil TX C.

When the rotor is in position 420, the rotor is at the position in its rotation that is between windings B 406 and windings C 408 and relatively far from windings A 404. In this case, position 420 of the rotor has a relatively larger effect on the inductance of windings B 406, corresponding transmission coil TX B, windings C 408, and corresponding transmission coil TX C and a relatively smaller effect on the inductance of windings A 404, and corresponding transmission coil TX A. This effect of position 420 of the rotor may be identified by a relatively small difference between the frequency of transmission coil TX A and the frequency of oscillator OSC A driving transmission coil TX A, a relatively medium difference between the frequency of transmission coil TX B and the frequency of oscillator OSC B driving transmission coil TX B, and a relatively medium difference between the frequency of transmission coil TX C and the frequency of oscillator OSC C driving transmission coil TX C.

When the rotor is in position 422, the rotor is at the position in its rotation that is closest to windings C 408 and relatively far from windings A 404 and windings B 406. In this case, position 422 of the rotor has the largest effect on the inductance of windings C 408 and corresponding transmission coil TX C and a smaller effect on the inductance of windings A 404, corresponding transmission coil TX A, windings B 406, and corresponding transmission coil TX B. This effect of position 422 of the rotor may be identified by a relatively small difference between the frequency of transmission coil TX A and the frequency of oscillator OSC A driving transmission coil TX A, a relatively small difference between the frequency of transmission coil TX B and the frequency of oscillator OSC B driving transmission coil TX B, and a relatively large difference between the frequency of transmission coil TX C and the frequency of oscillator OSC C driving transmission coil TX C.

When the rotor is in position 424, the rotor is at the position in its rotation that is between windings A 404 and windings C 408 and relatively far from windings B 406. In this case, position 424 of the rotor has a relatively larger effect on the inductance of windings A 404, corresponding transmission coil TX A, windings C 408, and corresponding transmission coil TX C and a relatively smaller effect on the inductance of windings B 406, and corresponding transmission coil TX B. This effect of position 424 of the rotor may be identified by a relatively medium difference between the frequency of transmission coil TX A and the frequency of oscillator OSC A driving transmission coil TX A, a relatively small difference between the frequency of transmission coil TX B and the frequency of oscillator OSC B driving transmission coil TX B, and a relatively medium difference between the frequency of transmission coil TX C and the frequency of oscillator OSC C driving transmission coil TX C.

Figure 5:
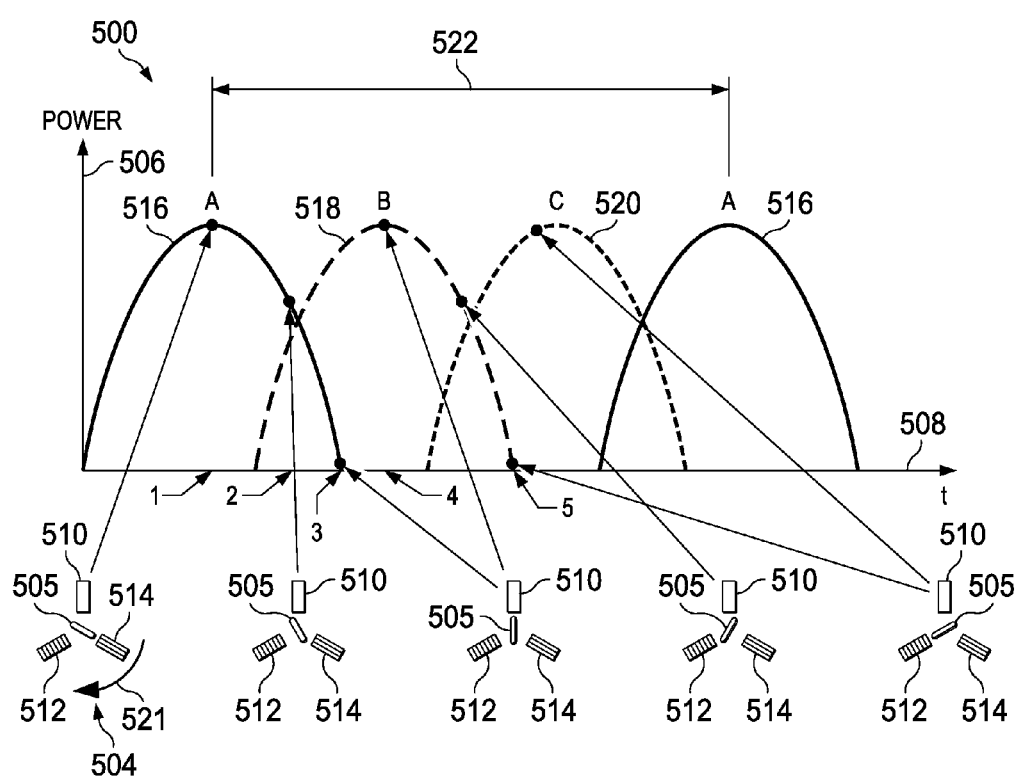
FIG. 5 is an illustration of a waveform diagram for identifying movement of a rotor for an electric motor in accordance with an illustrative embodiment.

Turning to FIG. 5, an illustration of a waveform diagram for identifying movement of a rotor for an electric motor is depicted in accordance with an illustrative embodiment. The method described with reference to waveform diagram 500 comprises a dynamic measurement of rotor movement based on the power provided to transmission coils in a power transmitter in accordance with an illustrative embodiment. This method of identifying the movement of a rotor may be useful, for example, without limitation, for identifying the speed, direction of rotation, dynamic position, and torque of the rotor. This method of identifying the movement of a rotor also may be useful for other appropriate purposes, or various combinations of purposes, for controlling the operation of an electric motor in accordance with an illustrative embodiment. The method described may be implemented, for example, in controller 120 to identify movement 142 and torque 147 of rotor 110 from the effect of movement 142 of rotor 110 on power transmitter 118 in FIG. 1.

As the rotor in an electric motor rotates, it draws electrical power from each of the motor windings in sequence to transform the electrical power to mechanical power. In accordance with an illustrative embodiment, each of the motor windings in turn may draw power wirelessly from a corresponding transmission coil. Power is therefore drawn by each of a plurality of transmission coils in sequence as the rotor moves. The order of the sequence of the power draws by the transmission coils may be used to identify the direction of movement of the rotor. The interval between the peak power draw by a given transmission coil and the next peak power draw by the same transmission coil corresponds to one half of the period of rotation of the rotor. The speed of movement of the rotor may be identified from this interval.

The mechanical power exerted by the rotor is equivalent to the sum of power drawn from all transmission coils multiplied by an efficiency factor. The efficiency factor may be measured or calculated in a known manner. The mechanical power produced by a rotor is equal to torque times angular velocity. Therefore, the torque produced during the rotor movement may be determined by multiplying the measured sum of power drawn by the transmission coils by the efficiency factor, and dividing the product by the speed of movement of the rotor.

Any appropriate method may be used to identify the power drawn by a transmission coil for the wireless transmission of power to the windings of an electric motor in accordance with an illustrative embodiment. For example, with reference once again to FIG. 3, the power drawn by transmission coil 300 for transmission to windings 302 of electric motor 305 may be identified at the output of oscillator 310 to transmission coil 300. For example, without limitation, the power drawn by transmission coil 300 may be identified using the measurements of voltage and current provided by voltage sensor 401 and current sensor 402, respectively, or in another appropriate manner.

Returning to FIG. 5, waveform diagram 500 illustrates the power drawn by three transmission coils providing power wirelessly to three-phase electric motor 504 in accordance with an illustrative embodiment. Waveforms in waveform diagram 500 may be used to identify the movement and torque of rotor 505 in electric motor 504. Illustrative embodiments may identify the movement and torque of the rotor in an electric motor having any other number of phases using a similar method. Power is identified in waveform diagram 500 with reference to axis 506. Time is identified with reference to axis 508 in waveform diagram 500.

In this example, electric motor 504 comprises rotor 505 and windings A 510, windings B 512, and windings C 514. Waveform 516 indicates the power drawn by a transmission coil that is used to provide power wirelessly to windings A 510 at a resonant frequency corresponding to the resonant frequency of windings A 510. Waveform 518 indicates the power drawn by a transmission coil that is used to provide power wirelessly to windings B 512 at a resonant frequency corresponding to the resonant frequency of windings B 512. Waveform 520 indicates the power drawn by a transmission coil that is used to provide power wirelessly to windings C 514 at a resonant frequency corresponding to the resonant frequency of windings C 514.

At time 1 rotor 505 is in a position aligned with windings C 514 of electric motor 504. For example, without limitation, the position of rotor 505 with respect to the windings in electric motor 504 may be identified using the method described above with reference to FIG. 4. Waveform 516 indicates that increasing power is provided to the transmission coil for providing power wirelessly to windings A 510. Windings A 510 thus may draw increasing power wirelessly from the transmission coil in the form of magnetic energy. This magnetic energy then allows windings A 510 to pull rotor 505, converting magnetic energy into kinetic energy.

At time 2, the power drawn by windings A 510 from the transmission coil for windings A 510 passively reduces as rotor 505 gets closer to windings A 510 and the conversion of magnetic energy to kinetic energy is reduced as there is less pull on rotor 505 by windings A 510. Waveform 516 indicates that the power drawn by the transmission coil for the transmission of power to windings A 510 is reduced as the power drawn by windings A 510 is reduced.

At time 3, rotor 505 is aligned with windings A 510. Waveform 516 indicates that the transmission coil for providing power to windings A 510 does not draw any power at this time, because no power is being drawn from the transmission coil by windings A 510. However, waveform 518 indicates that power drawn by the transmission coil for providing power wirelessly to windings B 512 is increasing so that windings B 512 may pull rotor 505 to continue the movement of rotor 505.

At time 4, the power drawn by windings B 512 from the transmission coil for windings B 512 passively reduces as rotor 505 gets closer to windings B 512 and the conversion of magnetic energy to kinetic energy is reduced as there is less pull on rotor 505 by windings B 512. Waveform 518 shows that the power drawn by the transmission coil for the transmission of power to windings B 512 is reduced as the power drawn by windings B 512 is reduced.

At time 5, rotor 505 is aligned with windings B 512. Waveform 518 indicates that the transmission coil for providing power to windings B 512 does not draw any power at this time, because no power is being drawn from the transmission coil by windings B 512. However, waveform 520 indicates that power drawn by the transmission coil for providing power wirelessly to windings C 514 is increasing at this time so that windings C 514 may pull rotor 505 to continue the movement of rotor 505.

This process continues, with power drawn by the transmission coils for providing power wirelessly to windings A 510, windings B 512, and windings C 514 in sequence to move rotor 505. In this case, the order of the sequence of waveforms 516, 518, and 520 indicates that power is drawn by the transmission coil for windings A 510, then power is drawn by the transmission coil for windings B 512, then power is drawn by the transmission coil for windings C 514. This sequence indicates that rotor 505 is moving in the direction of arrow 521.

The period of waveforms 516, 518, and 520 indicates one half of the period of rotation of rotor 505. For example, without limitation, period 522 may be identified as the time between the peak of one of waveforms 516, 518, or 520 and the next occurrence of the peak of that same waveform. The speed of movement of rotor 505 may be determined in a known manner as half of the inverse of period 522. The torque produced during the movement of rotor 505 may be determined by multiplying the sum of power drawn by the transmission coils for windings A 510, windings B 512, and windings C 514 by an efficiency factor, and dividing the product by the speed of movement of rotor 505. In this example, the sum of the power drawn by the transmission coils for windings A 510, windings B 512, and windings C 514 corresponds to the sum of the heights under waveforms 516, 518, and 520.

Illustrative embodiments provide a system and method for providing power and control wirelessly to the windings of an electric motor via resonant inductive coupling. In terms of size, weight, and power source improvements, illustrative embodiments reduce the motor portion itself to a form factor that may not be reduced any further. Illustrative embodiments provide more flexibility for the use of electric motors in various applications, reducing the size of a product in which an electric motor is employed, reducing the power dependency of such a product, improving the reliability of such a product, and reducing maintenance costs. One or more of the illustrative embodiments provides an improved capability for operating electric motors in unfriendly environments and through protective walls or other appropriate barrier structures. One or more of the illustrative embodiments provides a capability to use relatively inexpensive disposable electric motors in applications while reusing the electronics portions for providing power and control wirelessly to the motors.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of controlling an electric motor, the method comprising controlling a motion of the electric motor via:
    transmitting power to windings of the electric motor by wireless magnetic coupling between transmission coils and the windings, the electric motor being located at a first location and the transmission coils and electronic components controlling the motion of the electric motor being located at a second location physically separated from the first location;
    identifying, via the electronic components, a position of a rotor of the electric motor by identifying an effect of a position of the rotor on an inductance of a power transmitter;
    controlling, via the electronic components, a timing of transmitting the power to the windings in response to the position of the rotor;
    transmitting the power to the windings at a first frequency corresponding to a resonant frequency of first windings of the electric motor;
    and transmitting the power to the windings at a second frequency corresponding to a resonant frequency of second windings of the electric motor, the second frequency being non-harmonic to the first frequency.

2. A method of controlling an electric motor, the method comprising controlling a motion of the electric motor via:
    transmitting power to windings of the electric motor by wireless magnetic coupling between transmission coils and the windings, the electric motor being located at a first location and the transmission coils and electronic components controlling the motion of the electric motor being located at a second location physically separated the first location by a distance sufficient to reduce an electromagnetic interference from generating an undesired effect in the electronic components;
    identifying a position of a rotor of the electric motor by identifying an effect of the position of the rotor on inductance of the transmission coils; and
    controlling timing of transmitting the power by the transmission coils in response to the position of the rotor, such that as resonant frequency of a first winding in the windings changes, due to the position of the rotor, to a changed resonant frequency, a frequency of a power transmitting from a first transmission coil in the transmission coils changes to a changed frequency matching the changed resonant frequency.

3. The method of claim 1 further comprising:
    identifying movement of a rotor of the electric motor by identifying an effect of the movement of the rotor on power drawn by the transmission coils; and
    controlling timing of transmitting the power by the transmission coils in response to the movement of the rotor.

4. An apparatus, comprising:
    an electric motor comprising:
    a rotor;
    and a plurality of windings, wherein each of the plurality of windings has a different resonant frequency, and wherein resonant frequencies of the plurality of windings are not harmonics of each other;
    transmission coils configured to transmit power simultaneously to each winding in the plurality of windings;
    the electric motor located at a first location, and the transmission coils and electronic components;
    and the electronic components configured to:
    identify a position of the rotor by identifying an effect of the position of the rotor on an inductance of a power transmitter;
    and control a timing of transmitting power to the plurality of windings in response to the position of the rotor;
    controlling the electric motor being located at a second location different from the first location by a distance sufficient to reduce an electromagnetic interference from generating an undesired effect in the electronic components.

5. An apparatus, comprising:
    an electric motor that comprises:
    a rotor; and
    a plurality of windings, such that each of the plurality of windings comprises a different resonant frequency; and wherein resonant frequencies of the plurality of windings differ from each other by more than a bandwidth of a resonant peak for the each of the plurality of windings; and
    transmission coils configured to transmit power to the plurality of windings, the electric motor located at a first location and the transmission coils located at a second location different from the first location.

6. The apparatus of claim 4, wherein a resonant frequency of one of the windings in the plurality of windings matches a frequency of a wireless transmission of power to the electric motor from the transmission coils.

7. The apparatus of claim 6 further comprising a capacitor connected to the one of the windings, wherein a capacitance of the capacitor is selected such that the resonant frequency of the one of the windings matches the frequency of the wireless transmission of power to the electric motor.

8. The apparatus of claim 7, wherein the capacitor connected to the one of the windings comprises a variable capacitor configured to change the capacitance connected to the one of the windings in response to a position of the rotor to maintain the resonant frequency of the one of the windings constant when an inductance of the one of the windings changes in response to movement of the rotor.

9. An apparatus, comprising: electronic components configured to control a resonant:
    a power transmitter comprising transmission coils configured to transmit power to windings of an electric motor by wireless magnetic coupling to the windings, such that the power transmitter is configured to transmit the power to the windings at a plurality of different frequencies corresponding to resonant frequencies of the windings, and the power transmitter comprises:

a first transmission coil having a first resonant frequency corresponding to a resonant frequency of first windings of the electric motor:

a second transmission coil having a second resonant frequency corresponding to a resonant frequency of second windings of the electric motor, the first resonant frequency and the second resonant frequency being non-harmonic frequencies of each other;

and a controller configured to control the power transmitter to control timing of transmitting the power to the windings;

wherein the controllers is configured to:

identify a position of a rotor of the electric motor by identifying an effect of the position of the rotor on an inductance of the power transmitter;

and control the timing of the transmitting the power to the windings in response to the position of the rotor;

the electric motor located at a first location and the transmission coils located at a second location different from the first location by a distance sufficient to reduce an electromagnetic interference from generating an undesired effect in the electronic components.

10. The apparatus of claim 9, wherein the first resonant frequency and the second resonant frequency are different from each other by more than a bandwidth of a resonant peak for each of the first transmission coil and the second transmission coil.

11. The apparatus of claim 9, wherein:

the power transmitter comprises a transmission coil having an adjustable resonant frequency; and the controller is configured to adjust the adjustable resonant frequency of the transmission coil to match the resonant frequencies of the windings.

12. The apparatus of claim 9, wherein the controller is configured to:

identify movement of a rotor of the electric motor by identifying an effect of the movement of the rotor on power drawn by the power transmitter; and control the timing of transmitting the power to the windings in response to the movement of the rotor.

13. The method of claim 1, further comprising;

responsive to the resonant frequency of the first windings changing, responsive to a motion of a rotor affecting the first windings, to a changed resonant frequency of the first windings, the first frequency changing to a first frequency corresponding to the changed resonant frequency of the first windings; and a physical barrier separates the transmission coils from the windings.

14. The method of claim 13, wherein the electric motor is void of any wiring elements to and through the physical barrier.

15. The method of claim 1, further comprising the electric motor being an alternating current motor.

16. The apparatus of claim 4, further comprising the electric motor being an alternating current motor.

17. The apparatus of claim 9, further comprising the electric motor being an alternating current motor.

* * * * *

UNITED STATES PATENT AND TRADEMARK OFFICE
CERTIFICATE OF CORRECTION

PATENT NO. : 9,806,658 B2
APPLICATION NO. : 14/199272
DATED : October 31, 2017
INVENTOR(S) : Zeng et al.

It is certified that error appears in the above-identified patent and that said Letters Patent is hereby corrected as shown below:

In the Claims

Column 19, Line 62, change "such that as" to --such that a--
Column 20, Line 6, change "a rotor" to --the rotor--

Signed and Sealed this
Twenty-fifth Day of December, 2018

Andrei Iancu
*Director of the United States Patent and Trademark Office*